United States Patent [19]

Musgrove

[11] 3,954,017

[45] May 4, 1976

[54] WHEEL ASSEMBLY FOR SUPPORTING AN ENDLESS RESILIENT BELT FOR PICKING COTTON OFF THE GROUND

[76] Inventor: Earl E. Musgrove, 6861D E. Osborn Road, Scottsdale, Ariz. 85251

[22] Filed: June 6, 1975

[21] Appl. No.: 584,647

[52] U.S. Cl. .................................. 74/230.4; 56/49
[51] Int. Cl.² ..................... F16H 7/22; A01D 46/14
[58] Field of Search ............ 74/230.4, 230.3; 56/39, 56/40, 49

[56] References Cited
UNITED STATES PATENTS

| | | | |
|---|---|---|---|
| 1,903,776 | 4/1933 | Clark et al. | 74/230.3 |
| 2,279,887 | 4/1942 | Hathorn | 74/230.3 X |
| 3,148,491 | 9/1964 | Warmerdam | 56/49 X |

*Primary Examiner*—Leonard H. Gerin
*Attorney, Agent, or Firm*—Warren F. B. Lindsley

[57] ABSTRACT

An improved wheel assembly for a belt employed for harvesting cotton off the ground by means of a plurality of resilient cuts or notches in its outer surface which pick up the cotton from the ground comprising two identical wheel sections mounted on a non circular shaft coupler and held together by a bolt and self locking nut. The shaft coupler passes through a bearing assembly which is secured to a supporting arm of the harvesting equipment by a pair of flangettes with the assembly and disassembly for repair operation accomplished with a set of wrenches requiring no drilling or welding operations.

6 Claims, 3 Drawing Figures

WHEEL ASSEMBLY FOR SUPPORTING AN ENDLESS RESILIENT BELT FOR PICKING COTTON OFF THE GROUND

BACKGROUND OF THE INVENTION

A key element of a typical ground cotton harvesting machine is its resilient endless belt carried by a ground engaging belt supporting wheel and a spaced belt supporting drum, the belt moving at an angle to the ground rolls across the ground to pick up and hold the cotton for a predetermined time and then release same. The belt is provided with a plurality of resilient cuts which may be in the form of notches extending across the outer surface of the belt. As the belt travels over the belt wheel, the notches open and then close and as they clear the wheel, the closing action grasp pieces or bolls of cotton and hold it until the belt passes over the rear belt drum where the opening of the notches causes the cotton carried by the belt to drop for transfer to a screw auger. A typical example of such apparatus is the Rood Cotton Harvester disclosed in U.S. Pat. No. 2,670,584.

The wheel assembly presently employed in such equipment for driving the resilient belt for collecting the cotton utilizes a mating male and female pair of wheel sections. The male wheel section has a cap screw welded to its center while the female wheel section has a jam nut welded to its center. When the wheel is assembled, the end of the cap screw is turned through the jam nut and then passed through a center hole in the female section wheel. The end of the screw is then welded to the edges of the center hole to secure the assembly.

In the disassembly of the wheel assembly for repair purposes, it is necessary to drill out the welded hole, place one wheel section in a vise and using a vise grip, break away the remainder of the weld before the two wheel sections can be unscrewed from each other. Repairs can then be made, but on reassembly, another welding operation is required. Thus, the repair or rebuilding of the wheel assembly for the resilient belt drive of the known cotton picking equipment must be performed in a shop. Furthermore, the cap screw and jam nut may be destroyed in the drilling operation and always discarded when replacement of the wheel sections are required. Accordingly, repair operations are time consuming and expensive.

SUMMARY OF THE INVENTION

In accordance with the invention claimed, an improved wheel assembly for a belt for picking up ground lying cotton is provided which is easily assembled in the field with the aid of only a wrench set.

It is, therefore, one object of this invention to provide an improved wheel assembly for controlling the movement of a ground cotton picking belt.

Another object of this invention is to provide an improved wheel assembly for driving a resilient belt for picking up, carrying and then depositing cotton bolls which is easily repaired or rebuilt in the field without the use of power driven tools.

A further object of this invention is to provide such an assembly which is symmetrical in construction with interchangeable left and right hand parts, the commonality of parts contributing toward reduced manufacturing costs and a reduction in the number of spare parts required.

A still further object of this invention is to provide such an assembly which may be repaired or rebuilt without destroying associated parts in a substantially shorter period of time than the prior art structures.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
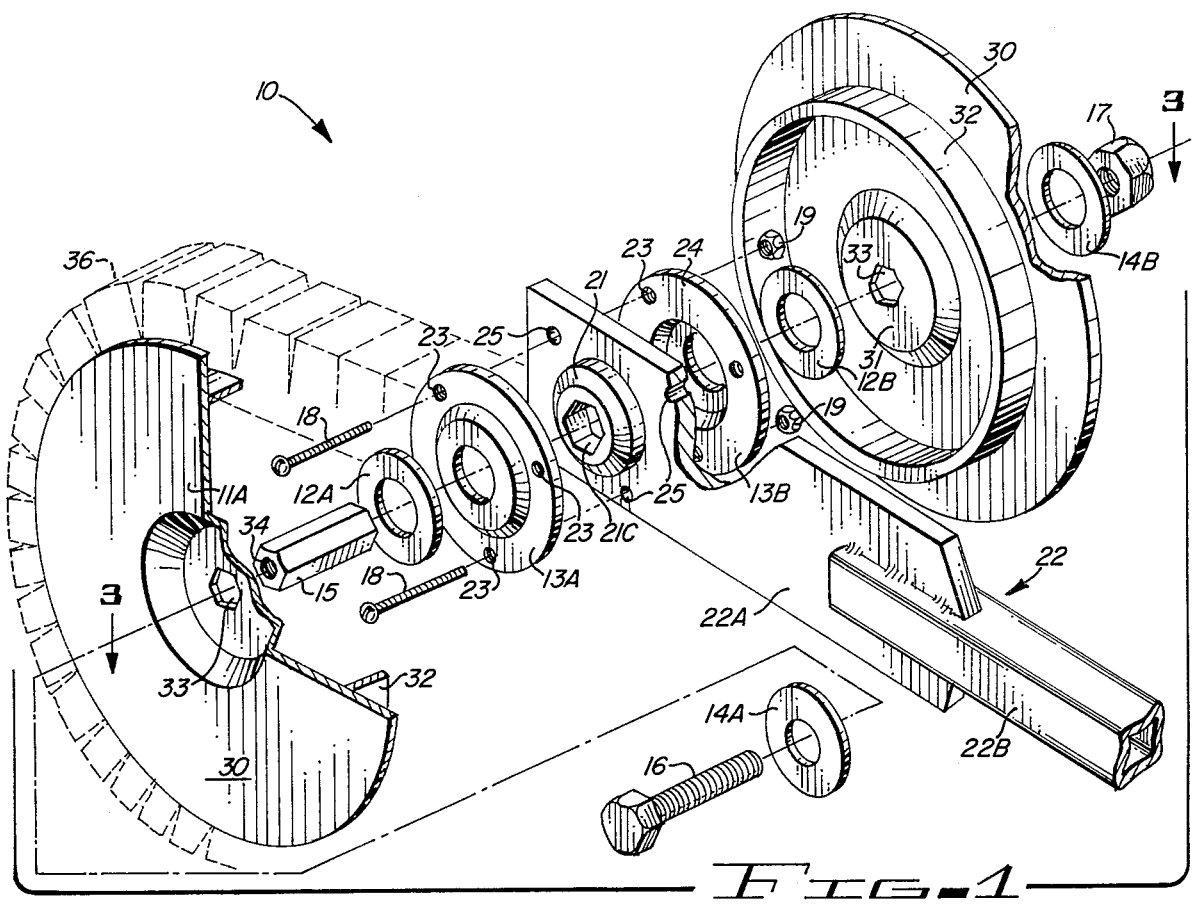
FIG. 1 is an exploded perspective view of a wheel assembly embodying the invention.
Figure 2:
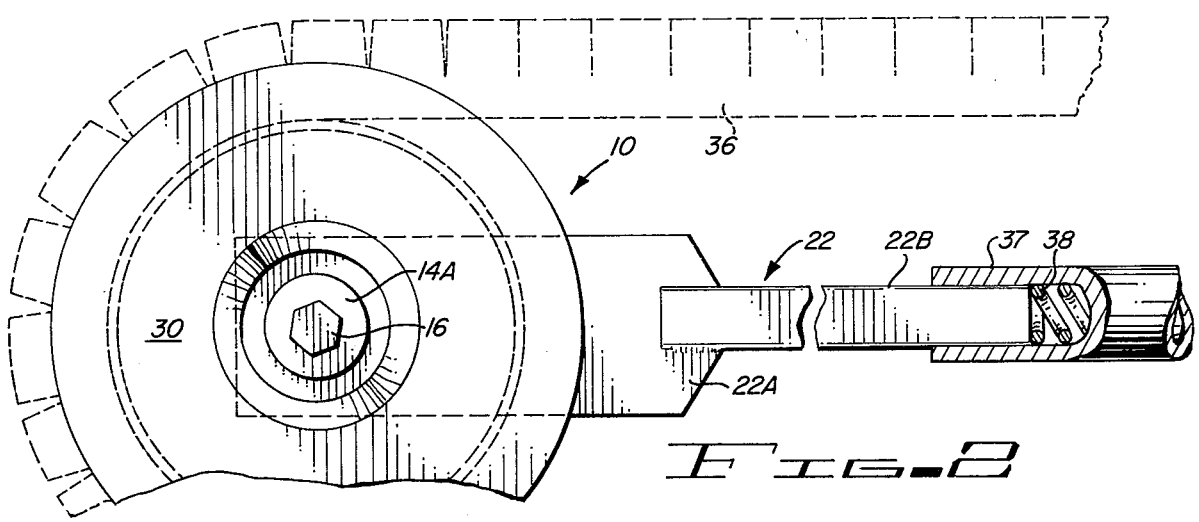
FIG. 2 is a side view of the assembly of FIG. 1.
Figure 3:
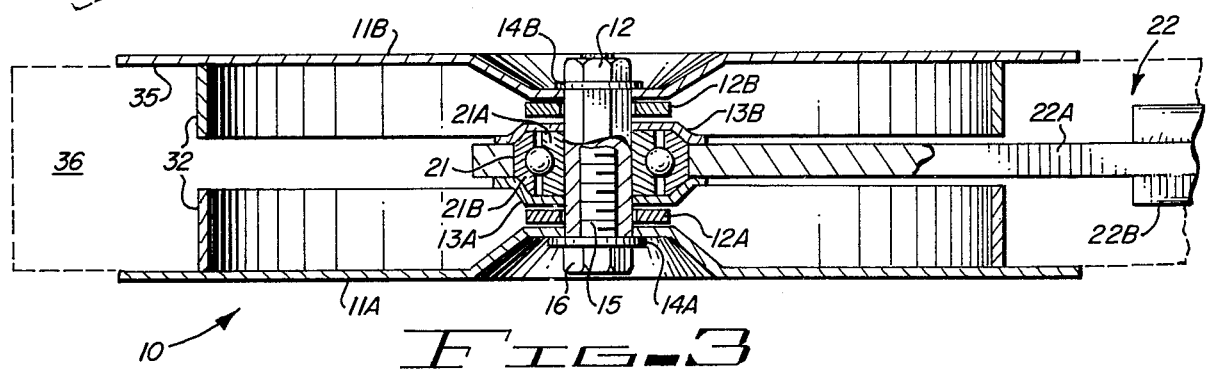
FIG. 3 is a cross-sectional view of FIG. 1 taken along the line 3—3.

Referring more particularly to the drawing by characters of reference, FIGS. 1–3 disclose an improved wheel assembly 10 for driving and controlling the movement of a ground cotton picking belt, the assembly comprising identical left and right hand wheel sections 11A and 11B, identical left and right hand spacer washers 12A and 12B, identical left and right hand flangettes 13A and 13B, and additional parts including outside washers 14A and 14B, a hexagonal shaped shaft coupler 15, a cap screw or bolt 16, a self locking nut 17, cap screws 18, nuts 19 and bearing 21. The assembly 10 is shown in relationship to a harvester mounted support arm 22 on which it is mounted.

Bearing 21 is of a standard configuration with flangettes 13A and 13B stamped to fit and hold the bearings outer ring in a manner similar to parts already employed in present equipment. The flangettes are dish shaped with open centers, each having three mounting holes 23 located in its flat outer rim 24. The bearing 21 is secured within a circular opening in an appendage of a harvesting machine (not shown) and herein shown as the flat paddle shaped end 22A of arm 22 by means of the two flangettes 13A and 13B which are clamped against opposite sides of bearing 21 by means of screws 18 and nuts 19, the screws passing through holes 23 in flangettes 13A and 13B and through mating holes 25 in end 22A of arm 22. When clamped into position thusly, the bearing 21 comprising an outer and inner race is cradled between the inwardly facing concave faces of the two flangettes 13A and 13B which are positioned on opposite sides of the bearing, their sloping walls gripping and holding fast the stationary outer ring 21B of bearing 21. The inner ring 21A of bearing 21 has a hexagonal shaped center hole 21C which is dimensioned to slip fit over hexagonal shaft coupler 15.

Each of the wheel sections 11A and 11B has a flat, shaped outer section 30 and an inset center section 31, section 31 having been die-formed in the shape of a pie pan. A circular band 32 in the form of a flat ring has an edge welded to the surface of the inside face of section 30 to extend laterally thereof toward the other wheel section. A hexagonal hole 33 is pierced through the center of section 31, the hole 33 being dimensioned to fit over hexagonal shaft coupler 15. The pie shaped inset center section 31 enhances the strength of wheel sections 11A or 11B and in the final assembly provides an identical space for the head of bolt 16 on one side and for nut 17 on the other side so that these parts will not interfere with other parts of the machine.

Hexagonal shaft coupler 15 which may be of any non circular configuration has an axial threaded center hole 34 which is drilled and tapped to receive bolt 16.

To assemble wheel assembly 10, bearing 21 is first mounted in arm 22 by means of flangettes 13A and 13B as described earlier. Washer 14A is then slipped over bolt 16 and the hexagonal shaft coupler screwed on the bolt firmly against the washer. The end of bolt 16 is then passed through hole 33 of wheel section 11A. The hexagonal shaft coupler 15 is then passed through spacer 12A, hole 21C of mounted bearing 21, spacer 12B, hole 33 of wheel section 11B and washer 14B. Nut 17 is then threaded down tightly over the end of bolt 16.

When the assembly is complete as just described, the inwardly facing bands 32 on wheel sections 11A and 11B cooperate to form an annular shelf between the inner surfaces of sections 31 of these sections for supporting band 32. The inside surface portions 35 of section 30 extending beyond band 32 form together with the bands 32 a channel which holds the notched belt 36 in a given annular track. A spaced rear belt drum assembly (not shown) holds the other portion of the endless belt 36 in a typical ground cotton harvester with wheel assembly 10 comprising a forward wheel and the rear belt drum the other wheel of the harvesting arrangement. The forward wheel supports the ground cotton picking belt 36 while the rear belt drum rides above the ground level opening the belt letting cotton held by the belt drop for transfer to a screw auger.

The arm 22 has in addition to the forward paddle shaped end 22A an axially aligned arm section 22B which is made from hollow tubing of a square cross sectional configuration. As shown in FIG. 2, the rear end of section 22B fits inside a hollow channel 37 also formed from square tubing having a compression spring 38 confined within channel 37 which bears against the end of handle section 22B to maintain the desired tension on belt 36 while allowing some motion of wheel 10 to accommodate the uneven surface over which it is driven.

It will be appreciated that the disassembly of wheel 10 is indeed a simple operation which may be performed in a very short period of time, it being necessary only to remove nut 17 before the other parts may be removed as required to gain access to bearing 21. The removal of the three screws 18 then frees the bearing for replacement. Reassembly is equally simple, and the consequent saving in time over the procedure required in the case of the prior art structures is significant. Furthermore, the operation may be readily performed in the field without the need for special tools such as a vise, drill or welding equipment. The objects of the invention are thus effectively met by the assembly of FIGS. 1-3 as described.

It should be noted that the prior art wheel assembly has been in use for many years and has been the only structure used even though repair or replacement of parts required an unusual amount of time and labor until this invention. Accordingly, the claimed structure is not believed to be obvious to a man skilled in the art.

Although but a single embodiment of the invention has been illustrated and described, it will be apparent to those skilled in the art that various changes and modifications may be made therein without departing from the spirit of the invention or from the scope of the appended claims.

What is claimed is:

1. A wheel assembly for supporting an endless ground lying, cotton picking belt comprising:
   bearing means comprising outer and inner coaxially aligned races mountable to extend through an opening in an appendage of a harvesting machine,
   a pair of flanges one mounted on each side of the bearing means for grasping and holding the outer race of said bearing means to the appendage and providing openings along their axes,
   said inner race being provided with an opening along its axis in axial alignment with the opening in said flanges,
   a pair of wheel sections,
   each of said sections comprising an opening along its axis for receiving a shaft coupler,
   a shaft coupler extending through and interlocking with the opening in one of said sections, the opening in one of said flanges, said opening of said inner race and said opening in said other wheel section, and
   bolt and nut means extending through said shaft coupler from one side of a first wheel section to the opposite side of the other wheel section for holding said wheel assembly together,
   each of said wheel sections being provided with an axially aligned circular flange extending inwardly of the wheel assembly toward the other wheel section for supporting the edges of a belt extending at least partially around the wheel assembly.

2. The wheel assembly set forth in claim 1 wherein: said shaft coupler is provided with a hexagonal cross sectional configuration and each of the openings of said wheel sections, flanges, and inner race are provided with similar openings of a slightly larger size, whereby said shaft coupler may extend through and engage the peripheries of these openings in a slip fit manner.

3. The wheel assembly set forth in claim 2 wherein: the center areas of each of said wheel sections protrude inwardly toward each other.

4. The wheel assembly set forth in claim 1 wherein: the aligned circular flanges of said wheel sections provide bearing surfaces for a resilient belt at a point adjacent the outer periphery of said wheel sections.

5. The wheel assembly set forth in claim 1 in further combination with:
   washer means mounted on said shaft coupler between each of said wheel sections and said bearing means.

6. The wheel assembly set forth in claim 1 in further combination with:
   an appendage providing with an aperture for receiving said bearing means, and
   means for attaching said appendage to a harvesting machine.

* * * * *